Nov. 15, 1927.

M. JACOB 1,649,408

CASH REGISTER

Filed May 3, 1924

M. JACOB

1,649,408

CASH REGISTER

Filed May 3, 1924

Nov. 15, 1927. 1,649,408
M. JACOB
CASH REGISTER
Filed May 3, 1924 5 Sheets-Sheet 4

M. JACOB 1,649,408

CASH REGISTER

Filed May 3, 1924  5 Sheets-Sheet 5

Patented Nov. 15, 1927.

1,649,408

UNITED STATES PATENT OFFICE.

MAX JACOB, OF ESSEN, GERMANY, ASSIGNOR TO FRIED. KRUPP AKTIENGESELLSCHAFT, OF ESSEN-ON-THE-RUHR, GERMANY.

CASH REGISTER.

Application filed May 3, 1924, Serial No. 710,956, and in Germany May 22, 1923.

This invention relates to cash registers and calculating machines and has more particularly reference to improvements in the totalizing counters of such machines.

The invention has for its primary object to provide a totalizing counter the movement of all parts of which substantially takes place without the use of springs and the movable parts of which are locked against unintended movements in all of their positions.

Another object of the invention is to provide a totalizing counter which is of a very compact construction so that a plurality of counters may be inserted in one machine without any difficulty.

The subject-matter of the invention therefore comprises novel means for the setting of the tens and the zero setting of the numeral drums.

With these and incidental objects in view, the invention consists in certain novel features of construction and combinations of parts, the essential elements of which are set forth in appended claims, and a preferred form of embodiment of which is hereinafter described with reference to the drawings which accompany and form part of this specification.

The cash register illustrated in the drawings is provided with a plurality of totalizing counters which are adapted to be selected by a hand lever for throwing them into the actuating members. The setting of the amount is likewise effected by means of hand levers. The amounts set are transferred to the totalizing counter thrown-in cooperative engagement by the operating mechanism of the machine through the intermediary of special toothed gearings.

Every totalizing counter is provided with a mechanism for setting the tens with which the setting operation which is divided into two phases, is performed by a step-like member which successively acts on the several points of the totalizing counter from the right to the left. This actuating member cooperates with tens setting sleeves carried by a special shaft. The said sleeves are shifted endwise by the transition of a totalizing member from 0 to 9; a quarter of a revolution is imparted to them for performing the transferring of the tens and, during the zero setting of the numeral drums, they are moved together with the said shaft away from the totalizing members.

The zero setting of the numeral drums is effected through the intermediary of the stepped tens transfer member upon rotating the shaft of the totalizing counter by means of a key introduced into the machine. During this operation the tens transfer member is shifted axially and lugs which are fixed to the same, enter into the path of zero setting stops of the numeral drums. When the tens transfer member is shifted axially, a plate provided with peep holes and usually hiding the numeral drums of the totalizing counter is adjusted in such a manner as to allow the amount registered by the totalizing counter to be read.

The mechanisms for throwing in and out the totalizing counters, for setting the amount and bringing the latter to the totalizing counters are exactly the same as those described in applicant's application Serial No. 691,484, filed February 8, 1924. These mechanisms will therefore be described only in as much as it is necessary for the understanding of the invention.

Differential mechanism.

Figures 6, 18:
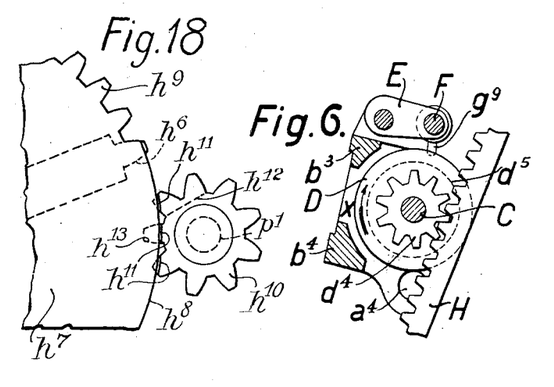
Fig. 18 shows details of the amount setting mechanism.

Mounted for rocking motion on pivot pins $a^3$, $a^4$ between frame members $A^1$ and $A^2$ (Figs. 1 and 16) are the frames B of the totalizing counters. Each frame consists of side walls $b^1$, $b^2$ and ledges $b^3$, $b^4$ which are connected with each other by cross pieces $b^5$. Extending through the cross pieces $b^5$ and the side walls $b^1$, $b^2$ is the shaft C of the totalizing counters which carries the numeral drums D. The numeral drums D are rigidly connected with the totalizing wheels $d^4$ which cooperate with a rack H having at its upper end a toothed portion $h^1$ which is in mesh with a differential wheel $h^2$ which is freely rotatable on the main shaft P. Arranged for free rotation besides the differential wheel $h^2$ is the amount setting lever $h^3$. This lever is held in every set position by a locking device $h^4$, $h^5$. The setting levers are rigidly connected with a single tooth $h^6$ and a disk $h^7$. The latter possesses a gliding surface $h^8$ concentric with relation to the shaft P, and in continuation of said surface a series of teeth $h^9$. As shown in Fig. 18, the gliding surface extends up to the upper flank of the single tooth $h^6$. Cooperating with the disk $h^7$ and the differential wheel $h^2$ is a planet wheel $h^{10}$ which is mounted by a pin $p^1$ on an arm $p^2$ rigidly connected to the shaft P. The planet wheel possesses a recess $h^{11}$ lying in the plane of the disk $h^7$ and cooperating with the gliding surface $h^8$ of the same, and another recess $h^{12}$ which lies in the plane of the single tooth $h^6$. When the recess $h^{11}$ is in contact with the gliding surface, the tooth $h^{13}$ of the planet wheel $h^{10}$ lies in a direction radial with respect to the shaft P. The above described device is provided for every denomination of the machine.

The shaft P carries at its right-hand end a crank arm $p^3$ to which is pivoted a rocking rod $p^4$. The other end of the rod $p^4$ is guided by a rod $p^5$ which is mounted on the frame of the machine. The rod $p^4$ shows a cam groove $p^6$ which is engaged by a roll $p^7$ of a toothed wheel $p^8$ mounted on the frame of the machine. The toothed wheel $p^8$ is in mesh with a toothed wheel $p^{10}$ to which the crank handle $p^9$ is fixed.

The operation of the differential mechanism is as follows: After the setting lever $h^3$ has been set to an amount, f. i. to the number 2, and the tooth $h^9$ together with the single tooth $h^6$ have thus been moved away from the tooth $h^{13}$ by a distance of two pitch-units (Fig. 18), a revolution is imparted to the crank $p^9$. During this operation a to and fro movement is imparted by the wheels $p^{10}$, $p^8$ and the roll $p^7$ to the rod $p^4$, which movement is transmitted to the planet wheel $h^{10}$ by the intermediary of the arms $p^3$ and $p^2$ of the shaft P. In its upwardly directed rocking movement the planet wheel, by its tooth $h^{13}$, carries with it the differential wheel $h^2$ as long as it is locked against separate rotation by its recess $h^{11}$ and the gliding surface $h^8$. As soon as the tooth $h^{13}$ strikes against the single tooth $h^6$ the planet wheel $h^{10}$ is forced to execute a rolling motion on the teeth $h^9$ which are at rest. As a result thereof, the differential wheel $h^2$ comes to rest after it has been carried along for a number of units (in this case 2 units) corresponding to the set number. During the return movement of the arm $p^2$ the differential wheel $h^2$ is again brought back to its position of rest. The rotation of the differential wheels $h^2$ is transmitted to the racks H which adjust the totalizing counters thrown-in by the amount set by the setting levers $h^3$.

Totalizer selecting mechanism.

Figures 1, 17:
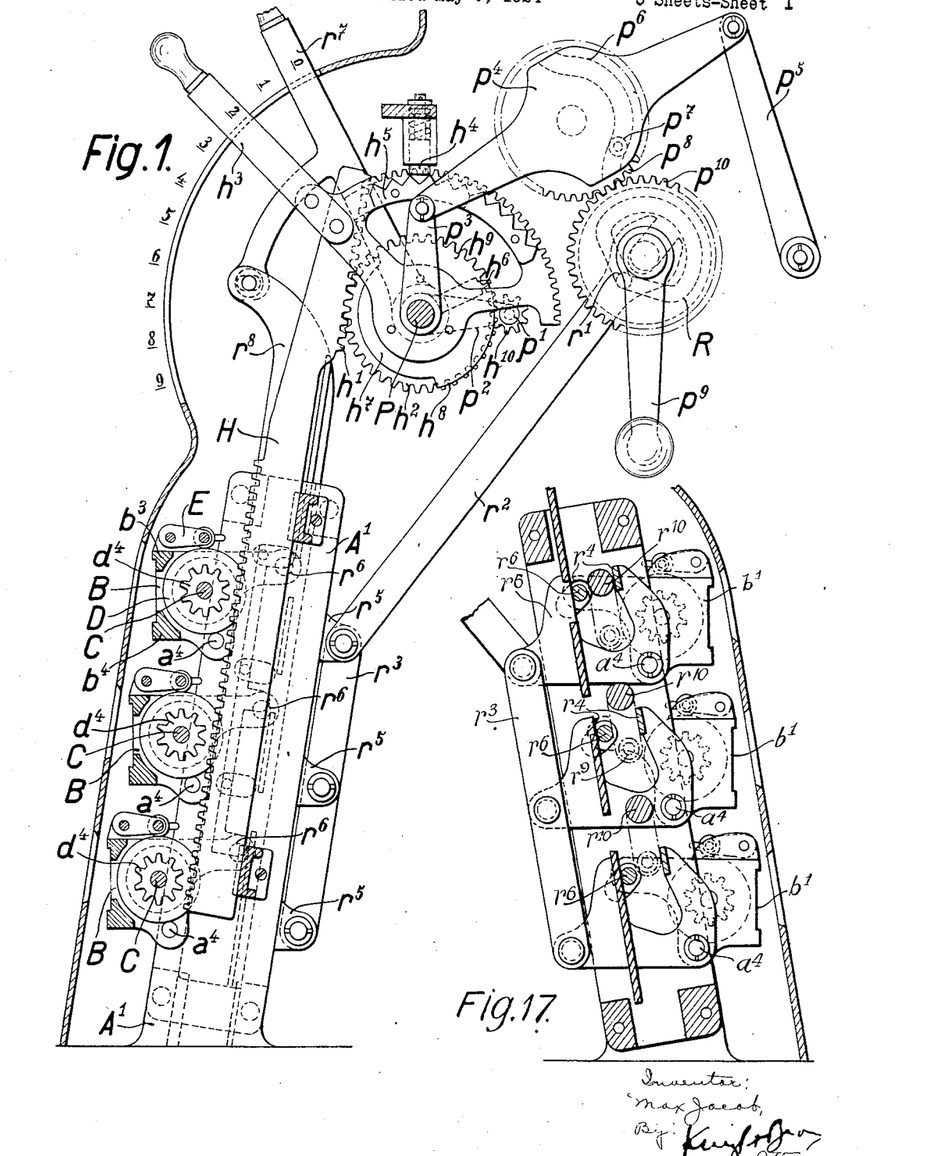
Fig. 1 is a sectional side elevation of the parts in consideration of the machine.
Fig. 17 is a section through the mechanism for moving the counters into and out of cooperative engagement.

By rocking the totalizing counter-frames B (Fig. 1) on the pins $a^3$ and $a^4$ (Fig. 16), their totalizing wheels $d^4$ are thrown into engagement with the racks H. The said rocking motion is effected by a grooved disk R which is connected to the crank $p^9$ and the cam groove of which is engaged by a roll $r^1$ of a connecting rod $r^2$. This rod is pivoted by its lower end to a link $r^3$, which connects three angle levers $r^5$ having claw-shaped gaps $r^4$ (Fig. 17). The angle levers are mounted on the pins $a^4$. Projecting into the claw-shaped gaps $r^4$ are pins $r^6$ which are attached to the side walls $b^1$ of the totalizing counters. $r^7$ is the selecting lever which is loosely supported on the shaft P (Fig. 1) and adapted to vertically shift a slide $r^8$ in a guide of the frame of the machine. The slide $r^8$ carries on pins $r^9$ (shown in dotted lines in Fig. 17) rockable fitting members $r^{10}$ which are adapted to be successively brought into the gaps $r^4$ by shifting the slide $r^8$. The gap $r^4$ is so large as to be filled by the fitting members $r^{10}$ and the pins $r^6$.

If the crank $p^9$ is rotated after the setting of the selecting lever $r^7$, all of the angle levers $r^5$ will be rocked through the intermediary of the curved groove R, the connecting rod $r^2$ and the link $r^3$. The totalizing counter the fitting piece $r^{10}$ of which is in the gap $r^4$, takes part in the said rocking motion, whereby the counter will be caused to engage the racks H.

*Transfer mechanism and zero resetting mechanism.*

Figure 2:
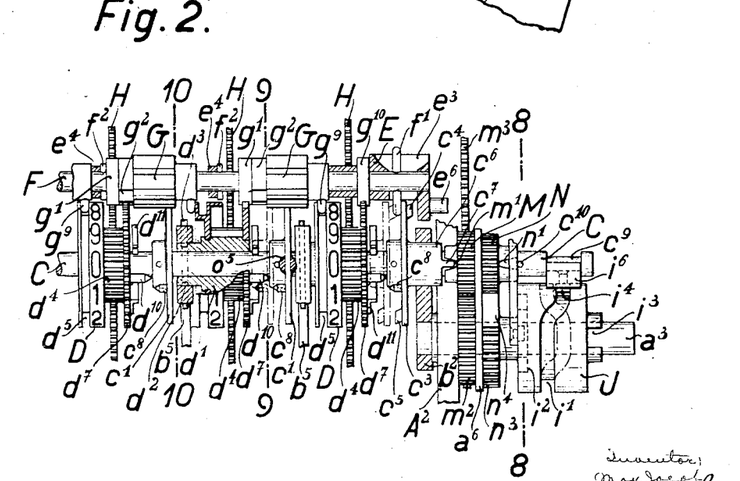
Fig. 2 is a front elevation, partly in section, of the totalizing counter, some parts being omitted.
Figure 3:
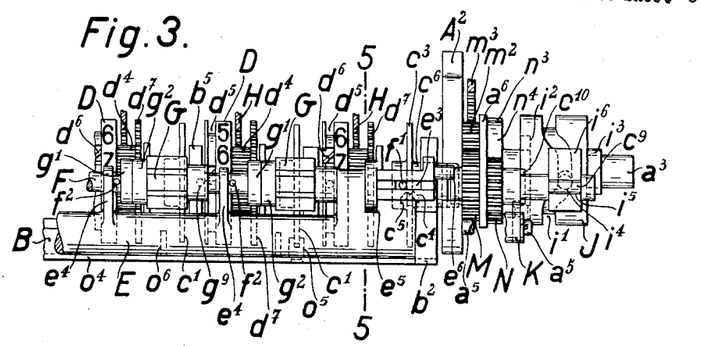
Fig. 3 is a corresponding plan view.
Figures 7, 8:
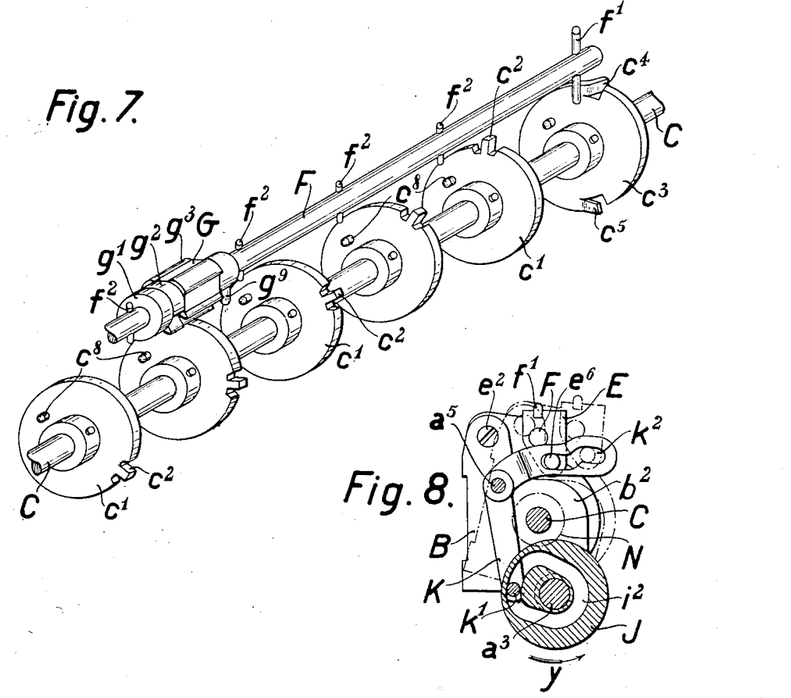
Fig. 7 is a perspective view of the tens setting elements.
Fig. 8 is a partial view of the totalizing counter, partly in section along the line 8—8 of Fig. 2.
Figure 10:
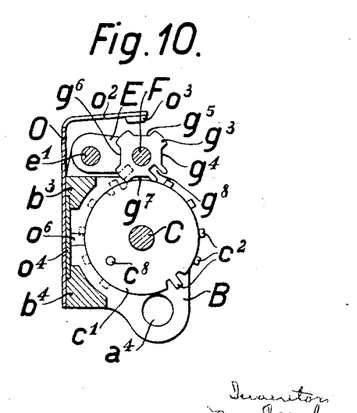
Figure 16:
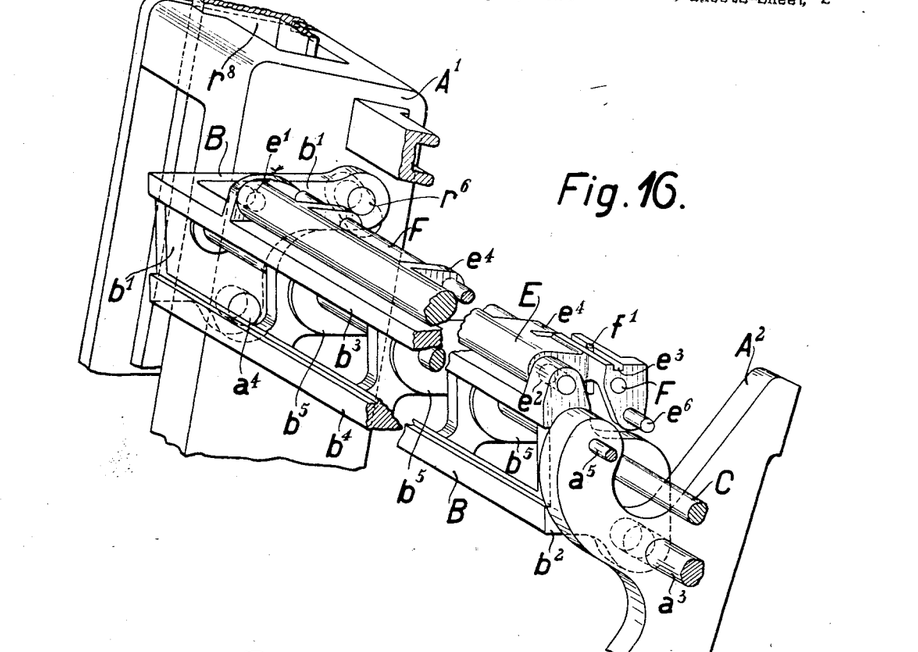
Fig. 16 is a perspective view of the frames of the totalizing counters.

Lugs of the upper ledge $b^3$ of the frame B of the totalizing counters swingingly support a frame E by means of pins $e^1$, $e^2$ (see more particularly Fig. 16). A shaft F which is shiftable in the frame E, is locked against rotation by a pin $f^1$ which is guided in a slot $e^3$ of the frame E (Figs. 2, 3 and 16). Mounted for free rotation on the shaft F are tens setting sleeves G, one setting sleeve each being arranged between a pin $f^2$ fixed to the shaft F and a flap $e^4$ of the frame E (Figs. 2, 3, 7). Every setting sleeve G consists of four parts rigidly connected with one another (see particularly Fig. 7): a circular disk $g^1$, a single tooth $g^2$, a locking member $g^3$ having recesses $g^4$, $g^5$, $g^6$, $g^7$, $g^8$ (Fig. 10) and an end piece which is provided with an actuating piece $g^9$. In the units section (Fig. 2, at the right), there is provided a disk $g^{10}$ instead of the setting sleeve G, said disk projecting into a slot $e^5$ (Fig. 3) of the frame E so as to be held against endwise shifting. The numeral drums D are fastened to sleeves $d^1$ (Fig. 2) which are held in their lateral position by being provided with grooves $d^2$ which are engaged by pins $d^3$ fixed in the cross-pieces $b^5$. The sleeves $d^1$ carry totalizing wheels $d^4$ which, in the thrown-in position of the totalizing counter (Fig. 6), are in mesh with the racks H. Every numeral wheel D is provided at its left-hand side with a groove $d^5$ which shows at a certain point a switch $d^6$ (Fig. 3). The pin $g^9$ of the setting sleeve G is adapted to cooperate with this groove $d^5$.

Figure 12:
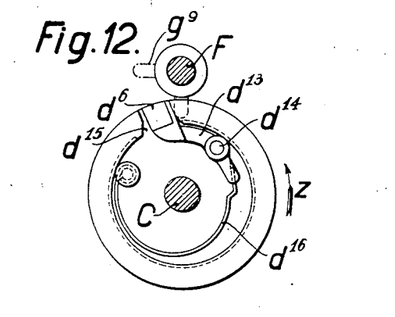
Fig. 12 is a view of a detail used for setting the numeral wheels individually.
Figure 13:
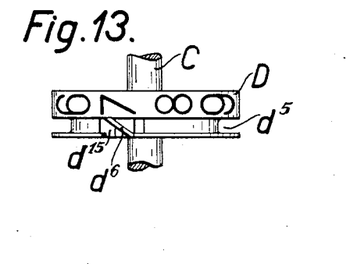
Fig. 13 is a plan view corresponding to Fig. 12.

In order to provide for an easy operation, the angle which is formed by the switch $d^6$ and the edge of the groove, is made as acute as possible. In order to allow the actuating pin $g^9$ to be rocked into the position indicated in Fig. 12 by dot and dash lines for the purpose to be hereinafter stated, the switch is made yieldable. The switch point $d^6$ is fixed to a lever $d^{13}$ mounted on a pin $d^{14}$ in the numeral drum D and projecting with its upper end into a recess $d^{15}$ of the bottom of the groove $d^5$. A spring $d^{16}$ tends to permanently press the upper end of the lever $d^{13}$ toward the right (Fig. 12). If the actuating pin $g^9$ is swung into its horizontal position, the point $d^6$ will give way toward the left, while during the setting motion of the numeral drum D, which takes place in the direction of the arrow $z$ of Fig. 12, the upper end of the lever $d^{13}$ abuts against the right-hand limit of the recess $d^{15}$ when the actuating pin $g^9$ enters into engagement with the switch point $d^6$.

Figure 9:
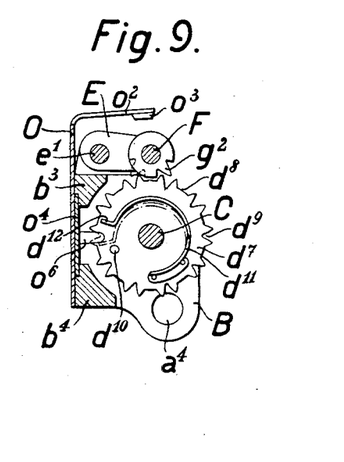
Figs. 9 and 10 are sections through the counter along the lines 9—9 and 10—10 of Fig. 2.

Attached to the right-hand end of the sleeve $d^1$ is a ratchet wheel $d^7$ which is of the shape to be seen from Fig. 9. Its shallow broad recesses $d^8$ cooperate with the disk $g^1$ or with the cylindrical portion of the single-tooth disk $g^2$, while the deeper narrow recesses $d^9$ are adapted to be engaged by the single tooth $g^2$ itself. The ratchet wheel $d^7$ carries on its right-hand side face a pin $d^{10}$ and a substantially arc-shaped plate spring $d^{11}$ with a bent-off end $d^{12}$ the object of which spring will be explained hereinafter. The shaft C has rigidly fixed to its disks $c^1$ the smooth peripheral surfaces of which are interrupted each by a single tooth $c^2$. As is to be seen from Figs. 7 and 10, those single teeth $c^2$ are arranged in stepped relation to each other, so that upon rotation of the shaft C the tens transfer sleeves G, the locking members $g^3$ of which cooperate with the disks $c^1$, are actuated successively. Near the side wall $b^2$ the shaft C carries a disk $c^3$ which is provided with two switches $c^4$, $c^5$. These switches are adapted to cooperate with the lower portion of the pin $f^1$ and shift the same laterally together with the shaft F. The hub $c^6$ (Fig. 2) of the disk $c^3$ projects outwardly through the side wall $b^2$ and has clutch teeth $c^7$ at its right-hand end. All of the single tooth disks $c^1$ and the switch disk $c^3$ carry on one of their side faces zero setting pins $c^8$ which are adapted to be moved into the path of the pins $d^{10}$ by imparting endwise shifting motion to the shaft C.

Figure 4:
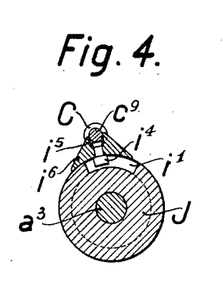
Fig. 4 is a section of a part of the zero setting mechanism.

The journal pin $a^3$ of the frame B is made to extend beyond the right-hand side of the bracket $A^2$. It carries a cylindrical drum J which is rotatable but not shiftable. The drum shows on its peripheral surface a cam groove $i^1$ (Fig. 2) and on its left-hand side face a cam groove $i^2$ (Fig. 8), while its right-hand end is offset and provided with slot-like notches $i^3$. A suitably shaped key may be introduced into those notches for the purpose of rotating the drum J. Projecting into the cam groove $i^1$ is a stud $i^4$ which is fixed to an intermediate member $i^6$. This member $i^6$ has a longitudinal groove $i^5$ (Fig. 4) which is engaged by an offset portion $c^9$ of the shaft C (see also Fig. 2) in such a manner as to allow the shaft C and the intermediate member $i^6$ to rotate but not to shift with relation to each other. As will be seen from the course of the cam groove $i^1$ (Fig. 3), a rotation of the drum J will cause the pin $i^4$, the intermediate member $i^6$ and the shaft C together with all parts carried by the same to be shifted to the left. Notwithstanding this endwise shifting movement, there may simultaneously take place a rotation of the shaft C around its geometrical axis and a rocking on the pins $a^3$, $a^4$ without the force-closed connection between the several parts being interrupted.

A pin $a^5$ (Fig. 16) of the bracket $A^2$ rotatably supports an angle lever K (Fig. 8).

The downwardly extending arm of this angle lever carries a pin $k^1$ which engages the cam groove $i^2$ of the drum J. The upper arm, which when seen from the front is cranked toward the left-hand, possesses a cam slot $k^2$ which is engaged by a pin $e^6$ of the frame E.

Figure 15:
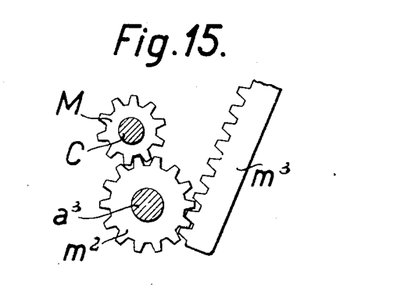
Fig. 15 is a view of the driving wheels for setting the tens.

Two pinions M and N (Fig. 2) are arranged for independent rotation on the right-hand end of the shaft C. They are held in their position by a portion $a^6$ of the frame of the machine. The pinion M possesses on its left side a coupling notch $m^1$ which cooperates with the clutch teeth $c^7$; it is in mesh with a pinion $m^2$ (Fig. 15) which is freely rotatable on the pin $a^3$ and driven during the operation of the machine by a rack $m^3$ mounted for reciprocation in the frame of the machine. The rack $m^3$ receives its reciprocatory movement by a grooved cam disk, similar to the disk R (Fig. 1) moved by the crank $p^0$.

Figure 14:
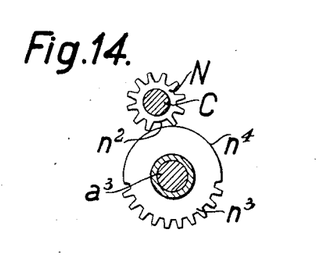
Fig. 14 is a view of the driving wheels for the zero setting.

The pinion N (Fig. 2) possesses on its right-hand side a coupling notch $n^1$ which will be engaged by a pin $c^{10}$ of the shaft C when same is shifted to the left. The pinion N has eleven teeth and a free space $n^2$ (Fig. 14) where a tooth is omitted. It cooperates with a gear wheel $n^3$ which is fixed to the drum J and which has only part of its rim provided with teeth. When the machine is at rest, the pinion N is held in locked position by the free space $n^2$ being in engagement with the toothless rim portion $n^4$ of the wheel $n^3$. As the wheel $n^3$ has eleven spaces of teeth, the pinion N will make one revolution at each revolution of the wheel $n^3$.

Figure 11:
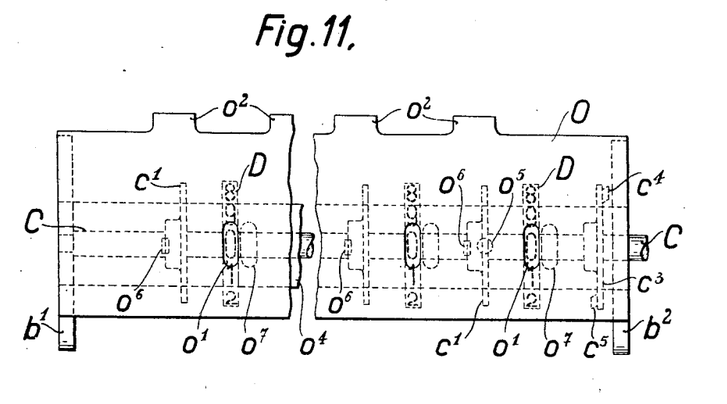
Fig. 11 is a front elevation of the counter.

The front side of the totalizing counter is covered by a plate O (Figs. 9 and 11) which possesses peep holes $o^1$ for the numeral drums. The upper edge of the plate O is provided with rectangularly bent flaps $o^2$ the enlarged ends $o^3$ of which are adapted to cooperate with the recesses $g^5$ and $g^6$ of the setting sleeve G. Shiftably mounted in horizontal guides of the frame B in rear of the plate O is an intermediate plate $o^4$. This plate carries a slotted pin $o^5$ (Figs. 2, 3 and 11) the slot of which is engaged by one of the disks $c^1$ so that the lateral position of the plate $o^4$ is determined by the respective lateral position of the shaft C. Lugs $o^6$ of the plate $o^4$ which are directed toward the shaft C enter into the path of the ends $d^{12}$ of the springs $d^{11}$ when the plate is shifted for the required distance to the left. Upon such shifting movement peep holes $o^7$ of the plate $o^4$ will register with the peep holes $o^1$ of the plate O so as to allow the inspection of the numeral drums D which are usually concealed.

Figure 5:
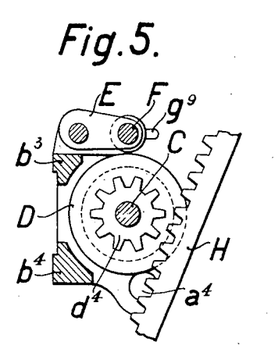
Figs. 5 and 6 are similar sections along the line 5—5 of Fig. 3, illustrating different working positions of the parts.

The operation of the tens setting mechanism is as follows:

When the totalizing counter is in position of rest, the gear wheels $d^4$ are out of engagement with the racks H (Fig. 5). The pin $e^6$ of the frame E is in the lower portion of the groove $k^2$ (Fig. 8) and the frame E is in its lowered position. The lower end of the pin $f^1$ of the shaft F abuts against the right-hand side of the switch disk $c^3$. In this position of the shaft F, the pins $f^2$ hold the tens setting sleeves G in their right limit position and the circular disks $g^1$ of the sleeves G engage the broad recesses $d^8$ of the ratchet wheels $d^7$ so that the numeral drums D are locked against unintended movements. The recesses $g^7$ of the sleeves G are in engagement with the cylindrical portion of the disks $c^1$ (Fig. 10) thereby holding the actuating pins $g^9$ in elevated position (Fig. 5). The stud $i^4$ together with the shaft C are in the right-hand limit position (Fig. 2). The zero setting pins $c^8$ are outside the path of the pins $d^{10}$. The shaft C is coupled with the pinion M through the means $c^7$, $m^1$, while the coupling $n^1$, $c^{10}$ between the shaft C and the pinion N is released. At the beginning of the operation of the machine a downward movement is imparted to the rack $m^3$ (Fig. 15) by rotating the crank $p^0$. During this motion the shaft C together with the disks $c^1$ is moved in counter-clockwise direction (Fig. 10) through the intermediary of the pinions $m^2$, M and the coupling $m^1$, $c^7$. Owing to their step-like arrangement the single teeth $c^2$ successively act on the setting sleeves G from the left to the right, the single teeth $c^2$ engaging the notches $g^8$ so that the same will come into the position indicated by dot and dash lines in Fig. 10, the setting sleeves will execute a quarter of a revolution in clockwise direction and the actuating pins $g^9$ will engage the grooves $d^5$ of the numeral drums D. At the same time the single tooth $g^2$ will come into the position indicated by dot and dash lines in Fig. 9. All of the setting sleeves having been rotated in the described manner, the switch $c^4$ of the disk $c^3$ will strike against the lower portion of the pin $f^1$ and shift the latter from the right to the left-hand side of the switch disk $c^3$ so that the shaft F together with the pins $f^2$ is shifted to the left and the setting sleeves G are released by the pins $f^2$ for being shifted to the left. The position reached by the shaft F after this period of movement is shown by Fig. 2. However, the setting sleeves G do not take part in the shifting movement of the shaft since their pins $g^9$ are held by the grooves $d^5$.

The totalizing counter selected by the selecting lever $r^7$ is now rocked in the described way about the pins $a^3$, $a^4$ from the position according to Fig. 5 into the position shown in Fig. 6. The gear wheels $d^4$ are thus caused to mesh with the racks H. The pin $e^6$ of the swinging frame E simultaneously moves toward the right (Fig. 8)

into that portion of the slot $k^2$ of the angle lever K which is situated at a higher level, the frame E being thereby rocked upwardly and the setting sleeves G lifted from the ratchet wheels $d^7$ and the single tooth disks $c^1$. The position of the frame B and the frame E after the said rocking motion is shown by the dot and dash lines in Fig. 8. The shape of the slot $k^2$ is such that the ratchet wheels $d^7$ are released only after the gear wheels $d^4$ have entered into mesh with the racks H. As will be understood with reference to Fig. 6, the actuating pins $g^9$ will remain in engagement with the groove $d^5$ also in the elevated position of the frame E. The recesses $g^6$ of the setting sleeves are engaged by the projections $o^3$ of the plate O and the sleeves are thus locked against rotation.

The racks H are now shifted downwardly in accordance with the amount set by the setting mechanism of the machine and the racks, in turn, cause rotation of the gear wheels $d^4$ and numeral drums D in the direction of the arrow $x$ of Fig. 6. If, during this rotary motion, the number 9 is going to be replaced by the number 0 in the peep hole of a numeral drum, the switch $d^6$ of the groove $d^5$ of the numeral drum contacts with the actuating pin $g^9$ and displaces it together with the setting sleeve G to the left, so that the single tooth disk $g^2$ will be caused to take its position above the ratchet wheel $d^7$ of the next higher degree (Figs. 2 and 3, second setting sleeve from the right), while the actuating pin $g^9$ will be moved to the left side of the edge of the groove $d^5$. After the amount set in the setting mechanism of the machine has thus been transferred to the numeral drums, the frame B is returned by the operating mechanism of the machine into its position of rest (Fig. 5), the pin $e^6$ entering the lower portion of the cam slot $k^2$ before the gear wheels $d^4$ have come completely out of engagement with the racks H. The frame E is rocked into the initial position (Fig. 9) so that the setting sleeves G re-enter into engagement with the disks $c^1$ and the ratchet wheels $d^7$ as in the position of rest of the machine. However, the recesses $g^4$ instead of the recesses $g^7$ are now in contact with the disks $c^1$, and the setting sleeves G which have been shifted to the left, have their single tooth disks $g^2$, instead of their circular disks $g^1$, in engagement with the ratchet wheels $d^7$.

The rack $m^3$ (Fig. 15) is now again moved upwardly whereby the shaft C is returned clockwise into its initial position and the single teeth $c^2$ return the setting sleeves to the position shown in Fig. 5 by imparting to them successively from the right to the left a return rotation by a quarter of a revolution. Those of the setting sleeves which had been shifted to the left for the tens transfer, by their single tooth $g^2$ rotate the ratchet wheel $d^7$ of the next higher degree by one unit, while the setting sleeves G which have not been shifted, lock the corresponding ratchet wheels $d^7$ against rotation by means of their circular disks $g^1$. The angular position of the several single teeth $c^2$ with relation to one another is determined so that a tooth $c^2$ will not come into engagement with its setting sleeve before the single tooth of the next lower degree has finished its operation. If therefore, during the rotation of the shaft C, a numeral drum D is turned by the operation of a setting sleeve from 9 to 0, the switch $d^6$ of this numeral drum will shift the corresponding actuating pin $g^9$ of the left neighboring setting sleeve G and the latter itself to the left so that, during the immediately following operation of the setting sleeve by the corresponding single tooth disk $c^1$, the numeral drum of the next higher degree will likewise be turned by one unit. In this way a "universal" tens transfer is attained.

When all of the setting sleeves have reached the angular position according to Fig. 5, the continued rotation of the shaft C will cause the switch $c^5$ to strike against the pin $f^1$ and shift the same together with the shaft F again to the right. The lower end of the pin $f^1$ takes its position on the right-hand side of swith disk $c^3$ and is locked there. Those of the setting sleeves which had been shifted to the left, are reshifted to the right so that all parts of the device are returned to their initial positions.

The zero setting of the totalizing counter is effected by imparting one revolution to the drum J in the sense of the arrow $y$, Fig. 8. This revolution may be executed by the intermediary of the operating mechanism of the machine or by means of a key inserted into the notches $i^3$ of the drum J. At the beginning of the rotation, the stud $i^4$ together with the shaft C and its disks $c^1$, $c^3$ are shifted to the left by the cam groove $i^1$, so that the zero setting pins $c^8$ enter into the path of the pins $d^{10}$ (see dot and dash position in Fig. 2). As the intermediate plate $o^4$ is coupled by its pin $o^5$ with one of the disks $c^1$ it takes part in the shifting motion of the shaft C and therefore its lugs $o^6$ are shifted to the left and caused to enter into the path of the ends $d^{12}$ of the springs $d^{11}$. The peep holes $o^7$ of the plate $o^4$ register with the peep holes $o^1$ of the cover plate O and the amount contained in the totalizing counter may be read as long as the rotation of the drum J is not continued. If it is only intended to read the amount of the totalizing counter, the parts may be returned to their initial position by simply returning the drum J after the reading has taken place. For the purpose of zero setting the rotation is continued. Upon shifting the shaft C to the left, its pin $c^{10}$ engages the coupling notch $n^1$ of the pinion N, the shaft C being thereby coupled with the said pinion while it is at the same time disengaged from the pinion M in as much as the clutch teeth $c^7$ are caused to disengage from the slot $m^1$ of the pinion M. In the meantime, the pin $k^1$ (Fig. 8) is moved by the cam groove $i^2$ toward the pin $a^3$, whereby the angle lever K is caused to rock in counterclockwise direction and the frame E swung upwardly by the action of the slot $k^2$ on the pin $e^6$. The gear wheels $d^4$ are thus released by the setting sleeves G the recesses $g^5$ of which receive the projections $o^3$ so that the sleeves are locked against rotation. Up to this time, the toothless rim portion $n^4$ of the wheel $n^3$ (Fig. 14) had moved underneath the space $n^2$ of the pinion N coupled to the shaft C so that the shaft C was held locked in its initial angular position. The teeth of the wheel $n^3$ now enter into mesh with the pinion N and a full revolution is imparted to the shaft C in clockwise direction. According to the position of the wheels of the totalizing counters the zero setting pins $c^8$ will sooner or later strike against the pins $d^{10}$ and carry these and the numeral drums D with them into the zero position. Shortly before the numeral drums reach their zero position, the ends $d^{12}$ of the springs $d^{11}$ come underneath the lugs $o^6$ of the plate $o^4$ and constitute rigid stops for the pins $d^{10}$ (see dot and dash position of the spring in Fig. 9), so that the numeral drums are prevented from turning beyond the zero position. The arrangement of resilient intermediate members $d^{11}$ for the zero setting is necessary because the zero setting shaft C must make a complete revolution in being returned into its initial position in contradistinction to other zero setting devices with which only a $\frac{9}{10}$ revolution of the carrying shaft takes place.

After the shaft C has executed a complete revolution, the frame E is lowered by the intermediary of the cam groove $i^2$, pin $k^1$, angle lever K, slot $k^2$ and pin $e^6$, the relative locking between the numeral drums D and the setting sleeves G, already described, being thus put again into action. At the end of the rotation of the drum J the cam groove $i^1$ (Fig. 3), owing to its particular course, will return the stud $i^4$ and the shaft C into the right-hand initial position. The zero setting pins $c^8$ retire out of the path of the pins $d^{10}$ and the lugs $o^6$ of the plate $o^4$ release the springs $d^{11}$. The latter spring back into the position indicated by full lines in Fig. 9. During the movement of the shaft to the right the coupling between the shaft C and pinion N is interrupted, while the shaft C is recoupled with the pinion M since the clutch teeth $c^7$ re-engage the slot $m^1$. Thus, all parts of the device are returned into their initial position and the numeral drums into their zero position.

While the form of mechanism herein shown and described is admirably adapted to fulfill the objects primarily stated, it is to be understood that it is not intended to confine the invention to the one form of embodiment herein disclosed, as it is susceptible of embodiment in various forms all coming within the scope of the claims which follow.

Claims:

1. In a totalizing counter, a numeral drum, a tens transfer sleeve in connection with said drum, means for axially displacing said sleeve relative to said drum, means for rocking said sleeve about its axis, means whereby during the rocking of said sleeve in one position said drum is locked thereby, means whereby on the rocking of said sleeve in another position said drum is advanced, and means for swinging said sleeve out of connection with said drum.

2. In a totalizing counter, a plurality of numeral drums, axially shiftable tens transfer sleeves for said drums, said drums being provided with circumferential cam grooves, and said sleeves having radially projecting pins for engaging in said grooves whereby said sleeves are adapted to be shifted into operative position relative to respective drums controlled thereby.

3. In a totalizing counter, a plurality of numeral drums, axially shiftable tens transfer sleeves for said drums, said drums being provided with circumferential cam grooves, said sleeves having radially projecting pins for engaging in said grooves whereby said sleeves are adapted to be shifted into operative position relative to respective drums controlled thereby, and means for laterally displacing said sleeves and drums without disengaging said pins from said grooves.

4. In a totalizing counter, a toothed wheel, a numeral drum in connection with said wheel, a rocking tens transfer sleeve, said sleeve including an annular portion and a toothed portion, said annular portion engaging the teeth of said wheel for locking said drum, and means for axially displacing said sleeve relative to said wheel for bringing the toothed portion thereof into operative position relative to said wheel.

5. In a totalizing counter, a toothed wheel, a numeral drum in connection with said wheel, a rocking tens transfer sleeve, said sleeve including an annular portion and a toothed portion, said annular portion engaging the teeth of said wheel for locking said drum, means for axially displacing said sleeve relative to said wheel for bringing the toothed portion thereof into operative position relative to said wheel, and means for laterally displacing said sleeve and said wheel.

6. In a totalizing counter, a toothed wheel, a numeral drum in connection with said wheel, a rocking tens transfer sleeve, said sleeve including an annular portion and a toothed portion, said annular portion engaging the teeth of said wheel for locking said drum, means for axially displacing said sleeve relative to said wheel for bringing the toothed portion thereof into operative position relative to said wheel, means for laterally displacing said sleeve and said wheel and a fixed external stop for cooperating with said sleeve in its displaced position.

7. In a totalizing counter a pair of numeral drums, a toothed wheel connected to the numeral drum of higher denomination, a circumferential groove in the other drum, a tens transfer sleeve including an annular portion, a toothed portion, and a radially projecting pin, said annular portion normally engaging said toothed wheel for locking its drum, said pin projecting into said groove, and a switch in said groove for laterally ejecting said pin on passage of the numeral drum of lower denomination from 9 to 0, whereby said sleeve is shifted axially to move said annular portion out of engagement with said toothed wheel, and said toothed portion into engagement therewith.

8. In a totalizing counter a pair of numeral drums, a toothed wheel connected to the numeral drum of higher denomination, a circumferential groove in the other drum, a tens transfer sleeve including an annular portion, a toothed portion, and a radially projecting pin, said annular portion normally engaging said toothed wheel for locking its drum, said pin projecting into said groove, and a switch in said groove for laterally ejecting said pin on passage of the numeral drum of lower denomination from 9 to 0, whereby said sleeve is shifted axially to move said annular portion out of engagement with said toothed wheel, and said toothed portion into engagement therewith, means for rocking said sleeve for advancing the numeral drum of higher denomination one numeral space, and for rotating said pin clear of its corresponding drum, means for returning said sleeve to initial axial position, and means for rotating said sleeve to again bring said pin into said groove.

9. A totalizing counter according to claim 8 in which the switch is pivotally mounted, and resiliently held against an abutment which supports it during ejection of the pin, the resilient means allowing pivotal movement of the switch on contact of the pin therewith during rocking of the sleeve.

10. A totalizing counter according to claim 7 in which the means for rocking the sleeve comprises a second toothed portion on the sleeve, and a single tooth disk for engaging the same, the annular portion of said disk engaging between the teeth of said second toothed portion to hold the sleeve against rocking except when rocked by said single tooth.

11. The combination with a totalizing counter having a plurality of numeral drums, a shaft coupling means between said shaft and each of said drums and means for moving said coupling means into engaging position, of a tens transfer means for each numeral drum and a plurality of tens actuating teeth one for each drum, arranged in a helical line about said shaft for consecutively actuating said transfer means.

12. The combination with a totalizing counter having a plurality of numeral drums, an axially shiftable shaft, coaxially arranged with respect to said drums, coupling means between said shaft and each of said drums and means for shifting said shaft to engage said coupling means and rotating said shaft to turn said drums to zero position, of a tens transfer means for each numeral drum and a plurality of tens actuating teeth one for each drum, arranged in a helical line about said shaft for consecutively actuating said transfer means.

13. The combination with a totalizing counter having a plurality of numeral drums, an axially shiftable and rotatable shaft coaxially arranged with respect to said drums and means for shifting said shaft to engage and disengage said coupling means, and a driven gear to which said shaft is clutched when said coupling is engaged, of a tens transfer means for each numeral drum and a plurality of tens actuating teeth one for each drum arranged in a helical line about said shaft for consecutively actuating said transfer means and a second driven gear to which said shaft is clutched when said coupling means is disengaged.

The foregoing specification signed at Essen, Germany, this 7th day of April, 1924.

MAX JACOB.